Aug. 25, 1936.  P. ASMUSSEN  2,051,811
SCALE MECHANISM
Filed March 4, 1935  4 Sheets-Sheet 1

Inventor
Peter Asmussen
By Charles L. Reynolds
Attorney

Aug. 25, 1936.   P. ASMUSSEN   2,051,811
SCALE MECHANISM
Filed March 4, 1935   4 Sheets-Sheet 2
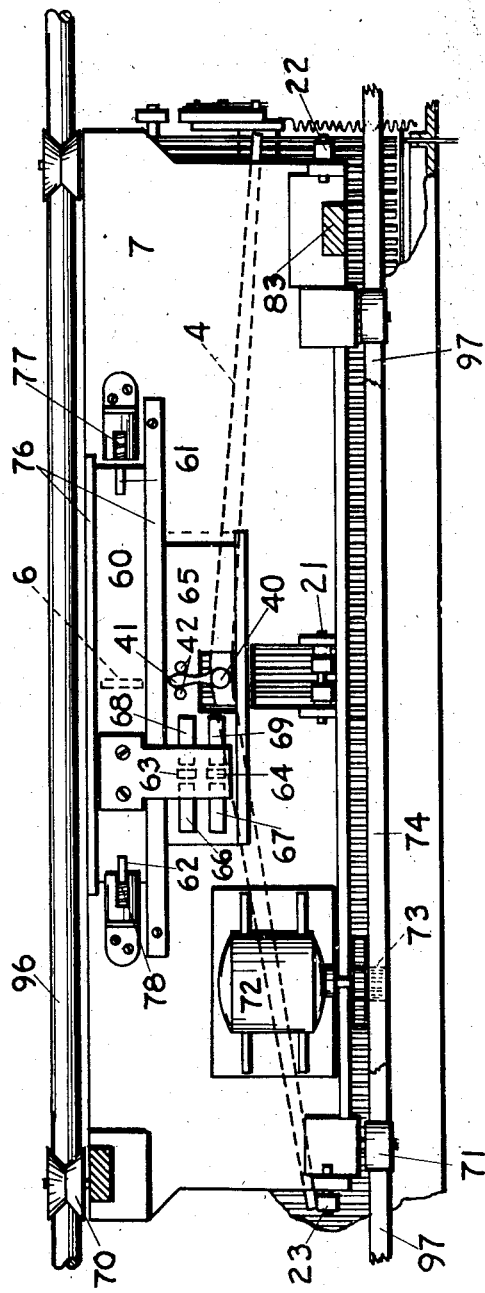
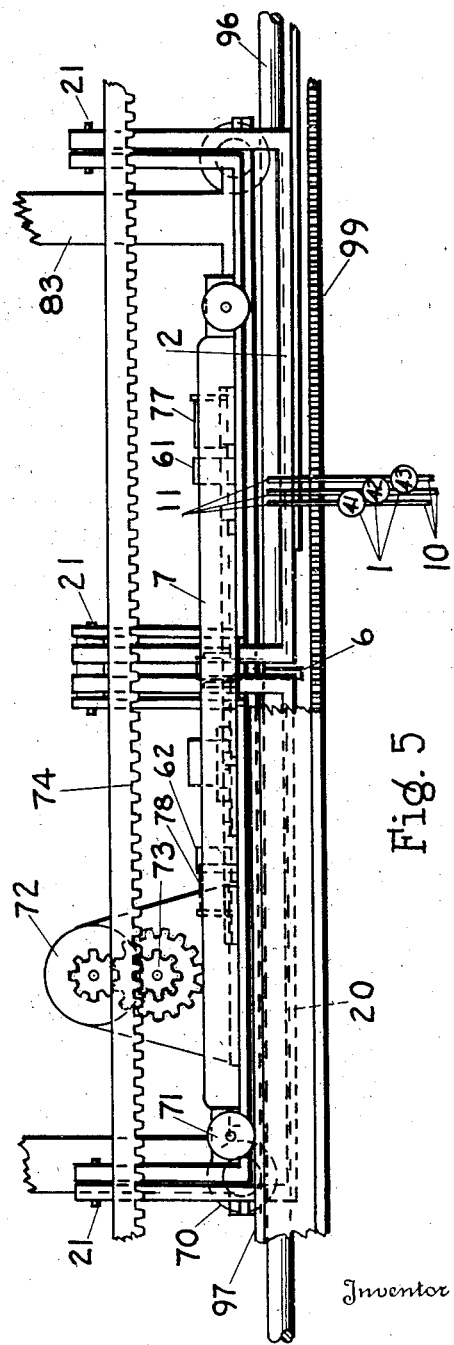
Inventor
Peter Asmussen
By Charles L. Reynolds
Attorney

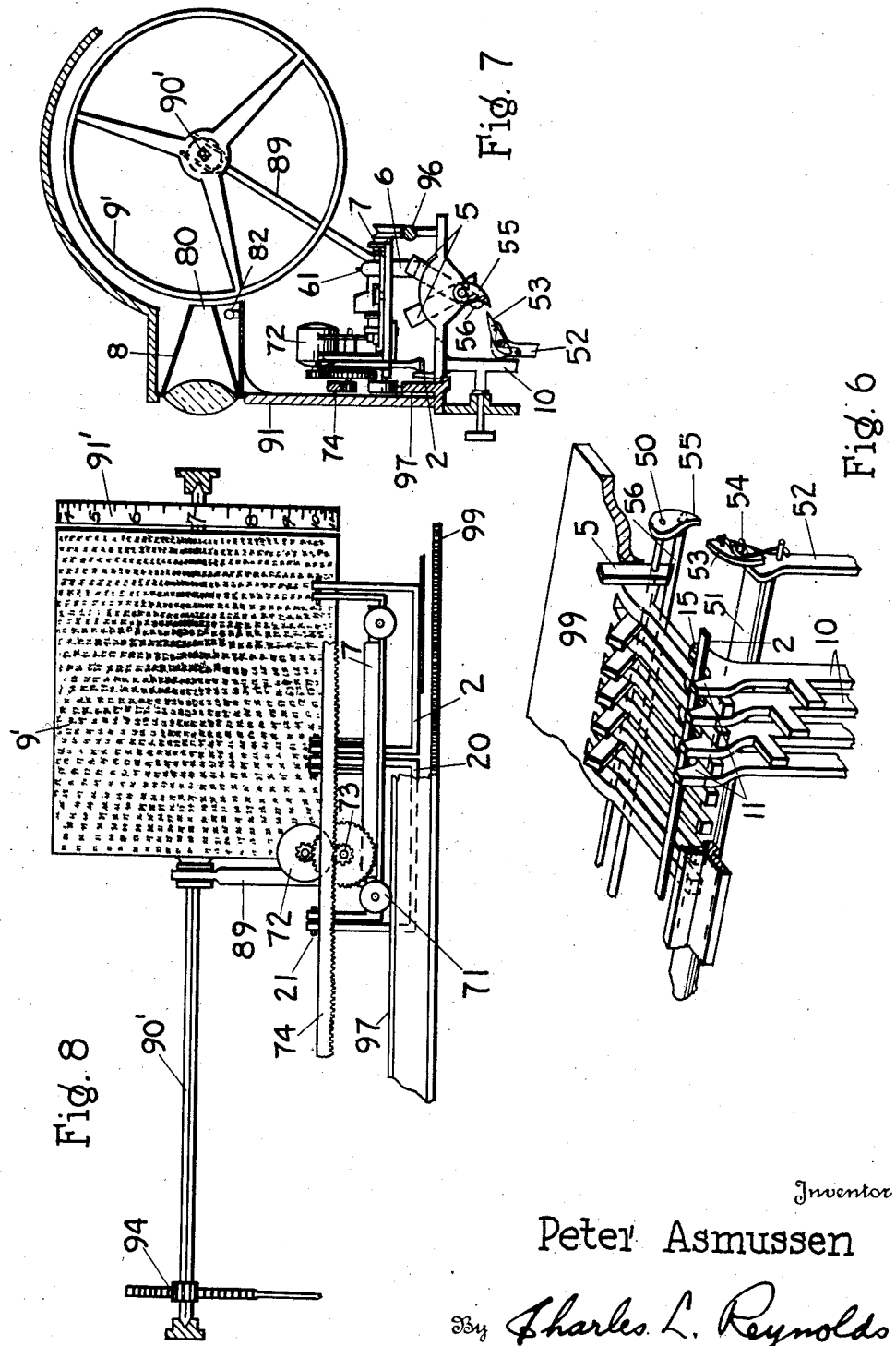

Aug. 25, 1936.  P. ASMUSSEN  2,051,811
SCALE MECHANISM
Filed March 4, 1935  4 Sheets-Sheet 4

Inventor
Peter Asmussen
By Charles L. Reynolds
Attorney

Patented Aug. 25, 1936

2,051,811

UNITED STATES PATENT OFFICE 2,051,811

SCALE MECHANISM

Peter Asmussen, Seattle, Wash.

Application March 4, 1935, Serial No. 9,241

20 Claims. (Cl. 265—29)

My invention relates to scales.

It is the general object of the invention to provide mechanism which, in association with scale mechanism, will indicate precisely the price of any given mass being weighed at any selected unit price, and which will indicate only or without possibility of mistake the price of the mass at that unit price, so that the clerk and the customer need not search among a mass of figures to discover the price of the mass, with the possibility of making a mistake, but will have clearly indicated before each of them the price of the particular piece being weighed at the proper unit price, and will, in addition, be shown the unit price when the scale platform or mass support is empty, and the weight of the mass when it is supported on the platform.

More specifically, it is an object to provide mechanism of the general character indicated, which may be controlled by such means as the pressure of a button corresponding to and marked with a given unit price, to effect relative movement between a price indicator and a chart, the latter of which is also movable, usually transversely to the movement of the price indicator, under the influence of the scale mechanism, to bring the indicator in registry only with a particular series of price calculations on the chart which correspond to the selected unit price, whereby upon placing the mass to be weighed upon the scale the price indicator will move as along a system of coordinates to indicate among that particular series the exact price of the particular mass.

It is a further object to provide such mechanism wherein the price indicator can be readily shifted from one series of price calculations to another, and further to provide mechanism which will accommodate itself automatically to all conditions which may occur; which, for example, will automatically adjust all the parts to insure precise registry even with the series of price calculations printed in extremely small type and closely spaced, as is necessary if a comparatively small chart is to receive all the price calculations of a considerable number possibly required in a given scale.

Among other objects are to provide safety devices to prevent interference or jamming of the mechanism, to accommodate the mechanism to and compensate for movement of the movable member in one direction or another, or in succession in the same direction, against fixedly located stops, to devise a price indicator which will indicate both to the clerk and to the customer at the opposite side of the counter at the same time, to provide delayed-action switch mechanism to insure return of the selector parts to normal before movement of the entrained mechanism, to effect illumination of the price indication, to provide mechanism which can be varied in shape and arrangement, so that it may be incorporated in many and widely varied types of scales, and in general to improve, simplify and safeguard the mechanical constructions necessarily incorporated in such mechanism.

My invention comprises the novel selectors, indicating and operating devices, and the novel combination of the same with each other and with scale mechanism, all as shown in the accompanying drawings, described in the following specification, and more particularly pointed out by the claims which terminate the same.

In the accompanying drawings I have shown my invention incorporated in illustrative forms, and in a somewhat diagrammatic manner, though it will be understood that the embodiment of my invention may be widely varied, and that the invention is not to be construed as restricted to the precise form shown, nor for use with the illustrated scale mechanism, or any particular scale mechanism, nor in any way other than as is defined by the claims at the end of this specification.

Figure 4 is a plan view, and Figure 5 an elevation of the carriage mechanism which effects positioning of the indicator.

Figure 6 is a detail perspective view of parts of the operating mechanism.

Figure 7 is a view similar to Figure 1, showing a part only of the mechanism, but illustrating a modified form, and Figure 8 is an elevation of the same form.

The form and arrangement of the scale mechanism itself constitutes no part of my invention, and any suitable scale mechanism may be employed. Any scale is provided with a chart and indicator. The present device contemplates the employment, as part of the scale mechanism, of a chart, whatever its shape or size, associated with any type of scale mechanism, the chart bearing a plurality of series of price calculations, each series being properly graduated and related to other series; a price indicator, the form of which, broadly speaking, is immaterial, which cooperates with the chart, and the operation of which is controlled by any unit price selector, one of a number capable of actuation by the clerk, whereupon the price indicator will indicate upon the chart the particular price of a mass being weighed at the selected unit price. Normally the chart is movable under the influence of the operation of the scale mechanism in response to placing a mass upon a mass support, and ordinarily the price indicator would be movable under the influence of operation of the unit price selector to a definite position with respect to the scale, and normally transversely of the direction of movement of the chart under the influence of the mass, so that by the combined movement of the price indicator and the chart a given point in a system of coordinates would be reached, which point would represent the mass price at a given unit price. However, it is not outside the scope of this invention to vary that arrangement, and essentially the invention consists in effecting cooperation between the chart and price indicator by actuation of a selected unit price selector, so that for any given mass at any selected unit price the price indicator will indicate upon the chart the price of that mass at that unit price, and that mass price only, so that there can be no question or mistake as to the price of the mass being weighed.

I shall now proceed to a detailed description of the mechanism, for convenience in understanding it, it being remembered that the form described is illustrative only.

Figure 3:
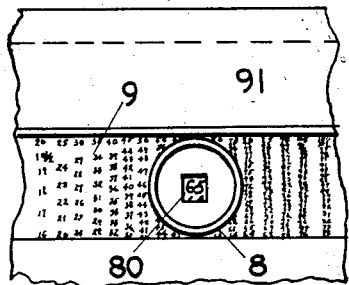
Figure 3 is a face view of the indicating mechanism, shown in conjunction with the chart.
Figure 1:
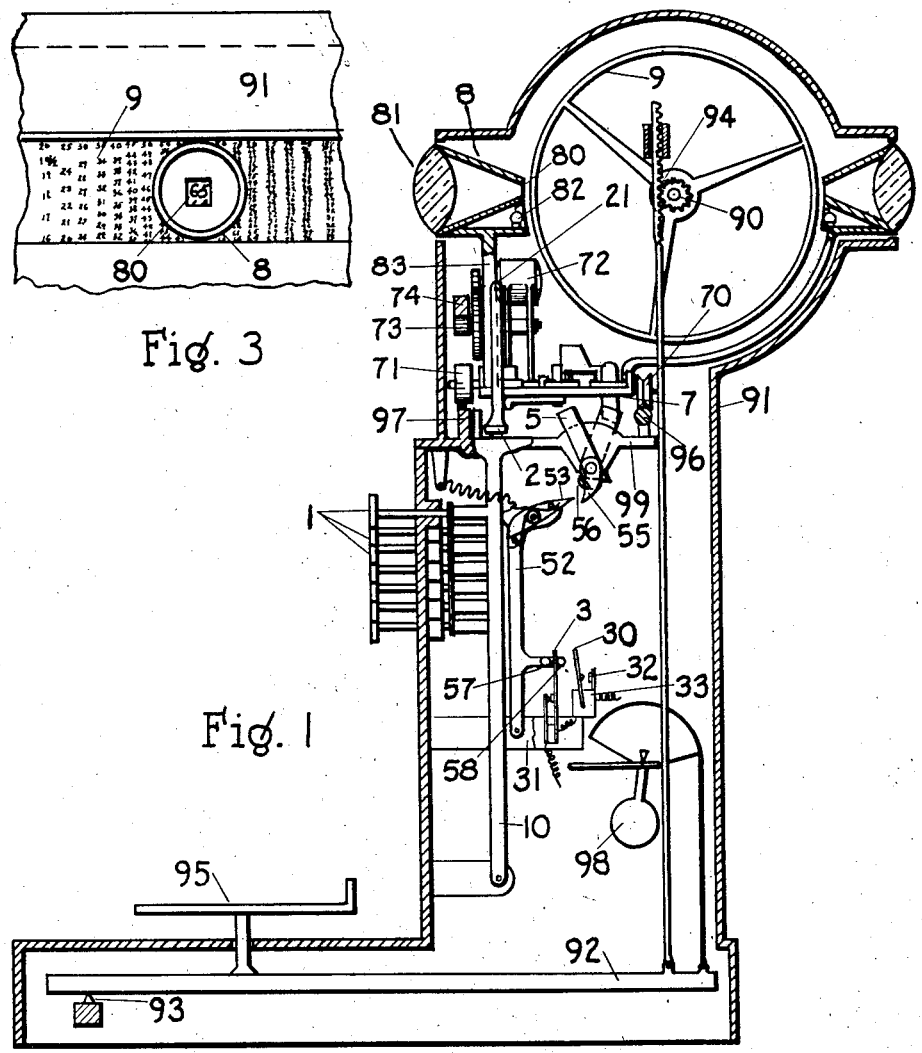
Figure 1 is a general vertical sectional view through a typical scale housing, illustrating the scale mechanism and the selecting and indicating mechanism associated therewith, parts being shown in position of rest.
Figure 2:
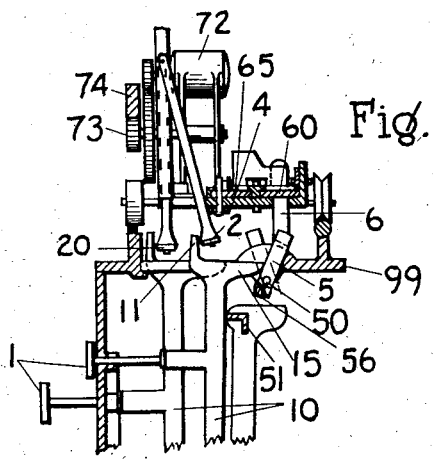
Figure 2 is a detail sectional view similar to Figure 1, showing parts in an operative position.

The scale mechanism, in the form shown in Figures 1 to 6 inclusive, consists of a cylindrical drum 9, carried upon and rotatable with a horizontal shaft 90 journaled in the scale housing 91, the drum carrying the chart having a plurality of series of graduated price calculations, as is indicated in Figure 3, the drum being rotatable by means of the rack and pinion connection, indicated at 94 (or by any suitable means), from a scale beam 92 fulcrumed at 93, the scale beam carrying a platform or mass support 95. A counterweight 98 would usually be provided in such a scale.

Instead of a hair line extending across the face of the chart, serving as a common indicator for all the series of price calculations, I provide as a price indicator a member 8 which may be of substantially conical nature so that it provides a small aperture 80 adjacent the surface of the chart, of a size to permit viewing only a single calculation of the chart. Since the chart will normally carry a large mass of figures which must be closely spaced, I may provide a lens 81 which magnifies the figure seen through the aperture 80 and enables it to be read from somewhat of an angle. To enable the figure to be viewed more easily a lamp 82 may be provided to illuminate the figure viewed through the aperture 80. The aperture 80, then, in effect, constitutes a price indicator, and provisions are made for effecting relative movement between the chart on the drum 9 and the aperture 80. Preferably this movement is accomplished by moving the aperture 80 in a manner which I shall now proceed to describe.

The member 8 is carried upon an arm 83 rising above a carriage 7. This member is duplicated at opposite sides of the drum, so that both the clerk and the customer opposite him may view the indication at the same time, it being evident that two charts, each bearing identical series of price calculations, would be provided on the drum. The carriage is mounted upon rollers 70 and 71 rolling along tracks 96 and 97 which extend parallel to the shaft 90. The only difference between these rollers and their tracks is that the roller 71 is shown as an electrical contact member and the track 97 may carry an energized bar by means of which current is delivered to the roller 71 and thence to mechanism upon the carriage 7.

Movement of the carriage along the tracks may be accomplished by various means; to this end I show an electric motor 72 mounted upon the carriage and driving a train of gears terminating in a pinion 73 in mesh with a rack 74 which parallels the tracks 96 and 97. The motor 72 is of the reversible type, so that the direction of movement of the carriage depends upon the direction of rotation of the motor, and consequently of the pinion 73.

It is necessary to point out at this time, without going into detail, that following initiation of movement of the carriage 7 in one direction or the other it is stopped by the engagement of a stop 6 mounted upon the carriage and projecting therebelow (for convenience in Figures 9, 10, 11 and 12 shown as projecting laterally) with one of a series of fixedly positioned stop levers 5, the position of which is normally out of the path of movement of the stop 6, but one of which is moved into operative or stopping position, and all others moved out of such operative position by actuation of one of the unit price selectors, to be described later. The stop 6, however, is not mounted rigidly to the carriage 7, but is carried upon a slide 60 guided at 76 upon the carriage and having upstanding fingers 61 and 62 engageable with the respective springs 77 and 78 at each end of the slide to leave the slide in a nearly neutral position between the two spring members 77 and 78, which are fixed upon the carriage. This effects a yielding, rather than a sudden stop for the entire carriage. The slide is not precisely centered by the springs, after a stop, for reasons which will later appear.

Carried by the slide 60 are electrical contacts 63 and 64, while a second slide 65, guided for movement on the carriage parallel to the slide 60, carries contacts 66, 67, 68 and 69. The latter are paired, and spaced but little more than the width of the contacts 63 and 64. Movement of the slide 65 is under the control of a lever 4 pivoted at 40 upon the carriage 7, and carrying a short arm 41 which is engageable with upstanding spaced pins 42 on the slide 65, whereby upon tilting of the lever 4 in one direction the slide 65 moves to effect contact between contacts 68 and 69 and the respective contacts 63 and 64, or upon swinging of the lever 4 in the opposite direction the slide 65 moves in such manner as to bring about contact between the contacts 66 and 67 on the slide 65 with the contacts 63 and 64 on the slide 60.

Figure 13:
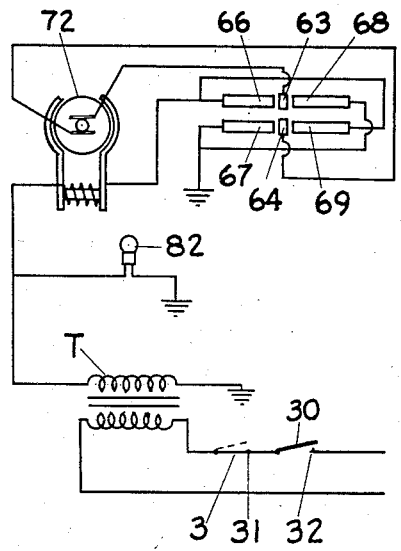
Figure 13 is an electrical diagram of the system which controls the movement of the carriage and the illumination of the indicator.

Referring now to Figure 13, the source of current for the present may be taken as the transformer T, by means of which the ordinary lighting circuit may be stepped down to lower voltage sufficient to operate the motor 72, and to energize the light 82, but insufficient to cause arcing between the contacts 63 and 64 and the cooperating pairs of contacts which in neutral position, lie close at each side of the contacts 63 and 64. In this diagram, Figure 13, it will be seen that if the contacts 63 and 64 engage the contacts 66 and 67, the motor will be operated in one direction, whereas if the contacts 63 and 64 engage the contacts 68 and 69 the motor 72 will be operated in the opposite direction.

Supported in the scale housing 91 are a plurality of unit price selectors including the buttons 1. As seen in Figure 5, these buttons may bear different unit price indications. Each button is mounted in front of a lever 10, a different lever for each button, suitably arranged that pressure of any given button will only swing the corresponding lever 10. Each such lever is provided with a forwardly projecting finger 15 and an upwardly projecting heel 11. The upper ends of all the levers are guided in accurately spaced slots in a plate 99, which in effect forms a part of the housing. This plate 99, then, assumes the appearance of a comb, and in each of the interstices is guided the upper end of a lever 10. The individual stops 5 are likewise conveniently mounted upon this plate 99 in the same interstices, pivoted at 50 somewhat below the path of movement of the finger 15, so that as the finger 15 of any given lever 10 moves forward, under the influence of pressure upon its button 1, the stop 5 which corresponds to this particular lever 10 is engaged and pressed inward into the path of the stop 6.

If, however, there had been a stop 5 previously in stopping position, it is essential that this stop be removed, and preferably this should be removed before location of a new stop in operative position. The means to this end comprise a frame consisting of a bar 51 extending across behind all the levers 10, supported on the upper ends of arms 52, the inverted U-shaped frame thus formed carrying at one or both ends a dog 53 pivoted at 54 and acted upon by a spring to hold it in position to engage a complemental dog 55 hinged at 50 coaxially with the hinge mounting of the stop 5. Associated with the dog 55 and extending across in front of the lower ends of all the stops 5 is a bar 56, and upon inward movement of the bar 51, which occurs when any one of the levers 10 is pressed inward, the dogs 53 will engage the complemental dog 55, and the bar 56, associated with the latter, will engage the lower end of any stop 5 which is in operative position and throw it back to the inoperative position, whereupon the dog 53 will pass beyond the dog 55, and upon the return of the bar 51 and arms 52 the dog 53 will snap under the dog 55 without effecting movement of the, by now, newly set stop 5. The setting of the new stop 5 is accomplished by the finger 15 of the particular lever 10 which corresponds to the newly pressed unit price selector button 1. The first action in pressing the button is to throw into inoperative position the previously set stop 5 and then immediately to throw into operative position the new stop 5.

At the same time that this action is going on, the heel 11 of the lever 10 corresponding to the button being pressed is engaging and swinging inward a bar 2 or 20 hinged at 21 upon the carriage 7. If the bar 2 is pressed, the arm 22 from which it depends will engage the right-hand end of the lever 4, previously referred to, as viewed in Figure 4, or if the bar 20 is engaged, its supporting bar 23 will engage and swing the left-hand end of the lever 4. The result is to effect movement of the slide 65 with its contacts in one direction or the other, and to bring either the contacts 68 and 69, or the contacts 66 and 67, into contact with the corresponding contacts 63 and 64, and this in turn effects operation of the motor 72 in one direction or the other. If the button 1 just previously pressed is again pressed, the lever 10 of this button enters a gap between the bars 2 and 20, and there is no change in the lever 4, and while the corresponding stop 5 is thrown back, it is immediately reset in operative position.

Figure 9:
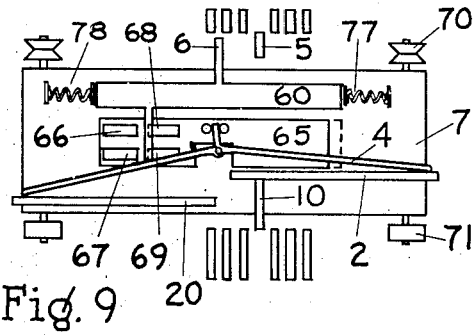
Figures 9, 10 and 11 show different stages of the carriage's movement in effecting a change of position, the figures being largely diagrammatic.
Figure 10:
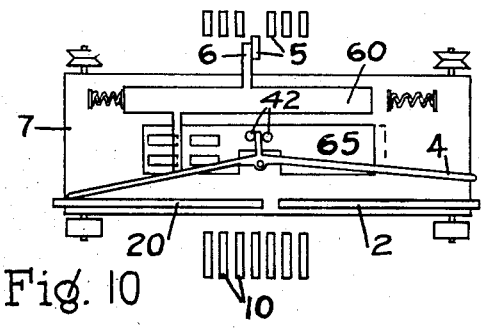
Figure 11:
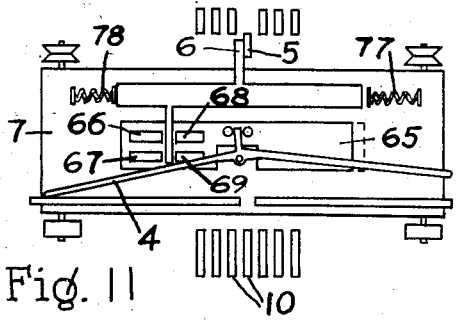

Referring to Figure 9, assume that a button 1 is pressed, so located that the motor is energized to move the carriage 7 to the right. The carriage moves until the stop 6 engages a stop lever 5 which corresponds to the button 1 that was pressed (see Figure 10), and upon engagement with this stop 5 the stop 6 is moved to the left with respect to the carriage, carrying the contacts 63 and 64 out of engagement with the contacts 68 and 69, and carrying the finger 62 into engagement with the spring 78, which being compressed immediately tends to return the slide 60, but in the meantime the contacts 63 and 64 have come into engagement with the contacts 66 and 67, as seen in Figure 10, reversing the motor and causing the carriage to move back toward the direction from which it came. There is a slight hunting of the indicator and carriage until they come to rest, as in Figure 11, with the indicator precisely in line with the series of price calculations corresponding to the unit price selector 1 which was pressed. If the carriage had just previously moved to the left, the initiation of movement to the right has effected shifting of the slide 65 and its contacts by an amount equal to the thickness of the stop 5, for this difference in the positioning of the carriage would otherwise throw the indicator off.

Meantime the lamp 82 has been illuminated, and upon placing a mass upon the scale platform 95 the drum 9 is rotated, and the combination of transverse movement of the aperture 80 and rotational movement of the drum brings in front of the aperture the particular price for the mass being weighed at the unit price corresponding to the button 1 which was punched. This indication, being magnified, appears, in the manner shown in Figure 3, to the clerk, and upon the opposite side of the scale to the customer.

Figure 12:
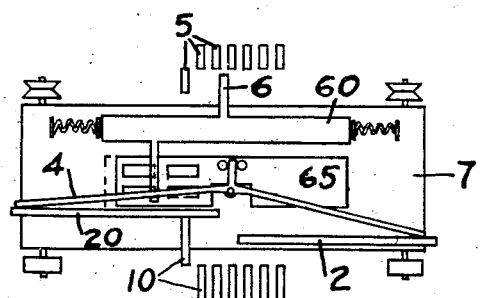
Figure 12 illustrates the commencement of a second cycle.

If now it is wished to move the carriage 7 in the opposite direction, that is, if a button 1 is pushed which is to the opposite side (say, to the left) of the division between the bars 2 and 20, as in Figure 12, upon pressure of the button the lever 4 is swung, shifting the slide 65 with respect to the contacts 63 and 64, again compensating for the thickness of the next stop 5, now to be engaged on the other side, as compared to the side of the previously engaged stop; the motor is again energized, the old stop lever 5 is moved out of the way, a new one is moved into operative position, and the carriage operates as before.

It may appear, if the bar 2 has just been swung inward, to tilt the right hand end of the lever 4 and to shift the slide 65 to the left (as seen in Figure 4), and the contacts 63 and 64 have been centralized between the contacts 66 and 67 at one side and 68 and 69 at the other side, that pressure of some other button 1 to effect inward swinging of the same bar 2 would not operate to shift the slide 65 (it having previously been shifted as far as possible in that direction), and that consequently no movement of the carriage would result. However, in stopping, the carriage-mounted stop 6 engaged a stop 5, compressing the spring 78. Due to inertia of the carriage, the compression was probably sufficient to shift the contacts 63 and 64 from contacts 68 and 69 to the opposite contacts 66 and 67. The motor reversed, disengaging the latter contacts, but not sufficiently to release all compression of the spring 78. As a result this spring, when subsequent actuation of a button 1 throws the stop 5 into inoperative position, shifts the slide 60 slightly to the right, relatively to the now unmoved slide 65 engaging the contacts 68 and 69 with the contacts 63 and 64, as just previously occurred, and the motor is energized in the same direction as before. Because the new stop is to be engaged on the same side as was the previous stop, no compensation for thickness of the stop is now required, hence no compensating shifting of the slide 65 should take place, and it does not.

It is not desirable to permit movement of the carriage 7 while any of the levers 10 or the bar 51 are pressed inwardly, as the parts might jam or interfere under some circumstances. Furthermore, it is desired to retain the lamp 82 lighted for some little period of time to enable the price indicator 80 to come to rest before the proper figure on the chart, and to give time to read it accurately. To these two ends I provide cooperative switch mechanism including the switch arms 3 and 30. The switch arm 3 carries a contact point which is normally in contact with a fixed contact point 31. The switch arm 30 is normally out of contact with the cooperating switch point 32. The switch arm 30 is controlled by a suitable delayed-action mechanism 33, such as is known in the electrical art, the nature of which is not in itself important, and which has therefore not been illustrated in detail, but the purpose of which is to retain the switch arm 30 in contact with the contact point 32 for a definite period of time before releasing the contact arm 30 to open the switch. As is seen in Figure 13, these switches are in series in the main circuit. Now as the arm 52 starts inward, a nose 57 first engages the switch arm 3 and opens this normally closed switch, breaking the main circuit completely, following which a nose 58 moves the switch arm 30 into closed position, closing this switch and starting the delayed-action mechanism into operation. Upon release of the button 1 which caused the inward movement of the arm 52, the switch arm 3 again effects contact with the switch point 31 and closes the main circuit. The companion switch having been closed, current now flows, but only after all selector parts have resumed their normal positions, and the transformer T is energized, lighting the light 82, and commencing the operation of the motor under control of the contacts 63 and 64. Upon breaking of the motor circuit at the contacts 63 and 64 operation of the motor stops, but the light 82 remains lighted until the delayed-action mechanism 33 effects the breaking of the switch between the switch arm 30 and the switch point 32, whereupon the main circuit is broken, and the light 82 goes out.

It will be recognized that it is immaterial whether the aperture 80 moves across the chart upon the drum 9, or the latter moves with respect to a fixed aperture 80; the result is the same. Accordingly in Figures 7 and 8 I have shown a construction in which a drum 9' is carried upon a square shaft 90' to slide along this shaft, and to be rotated by rotation of the shaft. The aperture 80 is carried in the housing 91 and the drum 9' moves transversely with respect to the fixed aperture 80. Such transverse movement of the drum is suitably effected, as by engaging with it a yoke 89 carried upon the carriage 7, so that while the drum is supported upon the shaft 90', and can slide along the same and turn with the same, its position lengthwise of the shaft 90' depends upon the position of the arm 89, which in turn depends upon the position of the carriage 7. In all other respects the construction of this form may be identical to that previously described.

It is desirable to indicate, in addition to the price of the mass being weighed, the weight of this mass, and to that end I provide a scale in weight units, as indicated at 91' in Figure 8, though the same scale may be employed in conjunction with the drum 9, this scale cooperating with a fixed indicator (not shown), at least an indicator fixed parallel to the direction of axial movement of the drum, if the latter is of the type shown in Figures 7 and 8, whereby the customer and clerk can always see the precise weight of the mass in addition to having an indication of the price of a particular mass. Also it is preferable that the first integer of each series of price graduations be the unit price of that series, and this will be indicated to the customer if the aperture 80 is moved into position with respect to the drum 9 before the mass is put upon the scale platform, or after it is removed therefrom, provided the unit price selector is first operated to effect movement of the price indicator, and thus the customer and the clerk have before them the unit price, the weight of the mass, and the price of the mass at that unit price.

If the customer desires an amount of a commodity of a given value, the clerk may punch the button designating the unit price of the commodity, and, disregarding the weight scale, weigh out sufficient of the commodity until the indicator 80 shows the figure which the customer desires to spend. Thus no calculations are involved, even for odd amounts of goods selling at unit prices which are awkward to calculate.

It is desired to emphasize that the detailed description given above is for the purpose of illustrating the principles of my invention, and of showing one or two ways in which those principles may be incorporated in an operative device, but my invention is not confined to the specific structure described, nor for use solely with the scale mechanism illustrated, but, indeed, is in general to be broadly construed, as will appear in the following claims.

What I claim as my invention is:

1. In combination with scale mechanism including a chart bearing a plurality of series of price calculations, each series corresponding to different unit prices, a price indicator, the chart and price indicator being relatively movable, unit price selector means, means energized by operation of the unit price selector means, and cooperating with the scale mechanism, when moved by a mass being weighed, to control and effect relative disposition of the price indicator and chart in position to indicate directly the single price corresponding to the mass being weighed at the unit price selected.

2. In combination with scale mechanism including a chart bearing a plurality of graduated price calculations at different unit prices, unit price selector devices each corresponding to a different one of the several price calculations, a price indicator, and means operable by actuation of a given selector device to effect relative movement between the chart and the price indicator to position the latter to indicate the corresponding price calculations, and upon operation of the scale mechanism to indicate the exact price of the mass being weighed.

3. In combination with scale mechanism including a chart movable under the influence of a mass being weighed, and bearing a plurality of graduated series of price calculations at different unit prices, unit price selectors each corresponding to a different one of the several series of price calculations, a price indicator, and means operable by actuation of any given selector to move the price indicator into indicating position with relation to the corresponding series of price calculations, whereby, upon movement of the chart under influence of a mass being weighed, the price indicator will indicate the particular price in the selected series of price calculations, which corresponds to the price of this mass at the selected unit price.

4. In combination with scale mechanism including a chart movable under the influence of a mass being weighed, and bearing a plurality of graduated series of price calculations at different unit prices, a plurality of unit price selectors each corresponding to a different one of the several series of price calculations, a price indicator, and means operable by actuation of any given selector to shift the chart, relative to the price indicator, into position wherein the latter may indicate only prices within the corresponding series of price calculations, whereby, upon movement of the chart under the influence of a mass being weighed, the price indicator will indicate the particular price in the selected series, which corresponds to the price of this mass at the selected unit price.

5. In combination with scale mechanism including a chart bearing a plurality of graduated series of price calculations at different unit prices, unit price selectors each corresponding to a different one of the several series of price calculations, a price indicator cooperating with the chart to form an indicating pair, one of the pair being movable relative to the other to position the indicator in operative relationship to some one selected series of price calculations, a carriage movable under the influence of any one of the several selectors, the movable one of the pair being mounted upon said carriage, and a plurality of stop means each movable upon actuation of a different one of the selectors to engage and stop the carriage in position to indicate only the series of price calculations corresponding to the actuated selector, whereby, upon movement of the chart under the influence of a mass being weighed, the price indicator will indicate the particular price in the selected series, which corresponds to the price of this mass at the selected unit price.

6. In combination with scale mechanism including a chart movable under the influence of a mass being weighed, and bearing a plurality of graduated series of price calculations at different unit prices, unit price selectors each corresponding to a different one of the several series of price calculations, a price indicator cooperating with the chart, and movable relative to the chart to indicate some one selected series of price calculations, a carriage guided for movement in a definite path under the influence of any one of the several selectors, the price indicator being mounted upon said carriage, and a plurality of stop means disposed along the path of the carriage, each moveable upon actuation of a different one of the selectors to engage and stop the carriage and price indicator in position to indicate only the series of price calculations corresponding to the actuated selector, whereby, upon movement of the chart under the influence of a mass being weighed, the price indicator will indicate the particular price in the selected series, which corresponds to the price of this mass at the selected unit price.

7. The combination of claim 6, wherein the carriage is reciprocable in its path between limits, a stop mounted upon the carriage for engagement at one side or the other by selected ones of said stop means, in turn, and means to compensate the position of the carriage, and therefore of the price indicator, for the thickness of the interengaged stops.

8. The combination of claim 6, wherein the carriage is reciprocable in its path between limits, a stop mounted upon the carriage for engagement at one side or the other by the selected ones of said stop means, in turn, and means supporting the stop from the carriage for limited movement relative thereto in the direction of the carriage's movement, to dispose the carriage and price indicator in precise registry with the selected series of price calculations, regardless of the thickness of the interengaged stop means.

9. In combination with scale mechanism including a chart movable under the influence of a mass being weighed, and bearing a plurality of graduated series of price calculations at different unit prices, a carriage guided for movement in each direction along a definite path, a price indicator carried thereby, a reversible motor for effecting such movement of the carriage, a switch on the carriage controlling energization and the direction of said motor, a stop arm operable to move the switch, and a plurality of stop levers each movable to and from a position to engage the stop arm, and each corresponding to a different series of price calculations, whereby, upon engagement of the stop arm with a selected stop lever, and upon movement of the chart under the influence of a mass being weighed, to position the price indicator, relatively to the chart, to indicate the price of the mass at the selected unit mass corresponding to the selected stop lever.

10. In combination with scale mechanism including a chart movable under the influence of a mass being weighed, and bearing a plurality of graduated series of price calculations at different unit prices, a carriage guided for movement in each direction along a definite path, a price indicator carried thereby, a reversible motor for effecting such movement of the carriage, a switch on the carriage controlling energization and the direction of said motor, a stop arm operable to move the switch, a plurality of stop levers each movable to and from a position to engage the stop arm, and each corresponding to a different series of price calculations, whereby, upon engagement of the stop arm with a selected stop lever, and upon movement of the chart under the influence of a mass being weighed, to position the price indicator, relatively to the chart, to indicate the price of the mass at the selected unit mass corresponding to the selected stop lever, means operable to move any one of the stop levers into position to engage the stop arm, and means operable by operation of the preceding means, and in advance of movement by the latter of a stop lever, to remove the theretofore operative stop lever from operative position.

11. The combination of claim 6, wherein the carriage is reciprocable in its path between limits, a stop mounted upon the carriage for engagement at one side or the other by the selected ones of said stop means, in turn, and means supporting the stop from the carriage for limited movement relative thereto in the direction of the carriage's movement, to dispose the carriage and price indicator in precise registry with the selected series of price calculations, regardless of the thickness of the interengaged stop means, and means operable by actuation of any price selector, and dependent upon the position of the carriage relative to such price selector, to determine the fact and direction of such movement of the last-mentioned means relative to the carriage.

12. In combination with scale mechanism including a chart movable under the influence of a mass being weighed, and bearing a plurality of graduated series of price calculations at different unit prices, a carriage guided for movement in each direction along a definite path, a price indicator carried thereby, a reversible motor for effecting such movement of the carriage, a switch on the carriage comprising two sets of contact points jointly movable and spaced apart and intermediate contact points adapted to contact alternatively with one or the other set to operate the motor in opposite directions, a stop mounted upon the carriage and operatively connected to the two sets of contacts to move the latter relative to the carriage, a plurality of unit price selectors, each corresponding to one of said series of price calculations, a plurality of stop levers, each corresponding to, and movable into position to engage the carriage-mounted stop by actuation of, one of said unit price selectors, and means operable by actuation of the one of the latter, other than the one previously actuated, to effect contact between the intermediate contact points and one or the other set of complemental contact points, thereby to energize and control the direction of the motor, and to move the price indicator towards indicating position relative to that series of price calculations which corresponds to the unit price selector which is actuated, engagement of the carriage-mounted stop with the just-positioned stop lever positioning the price indicator in such position.

13. The combination of claim 12, wherein the intermediate contact points are shiftable relative to the carriage, in a direction parallel to the direction of movement of the complemental sets of contact points upon the carriage, and the last-mentioned means includes a device to shift the intermediate contact points if a newly-actuated unit price selector requires reversal of the motor from its preceding direction.

14. In combination with scale mechanism including a chart movable under the influence of a mass being weighed, and bearing a plurality of series of price calculations at different unit prices, a carriage guided for movement in each direction along a definite path transversely to such movement of the chart, a price indicator carried by the carriage and cooperating with the chart to indicate, by movement of the chart, a given calculation in such series, a plurality of different unit price selectors, corresponding respectively to the different series, a plurality of stop levers, each movable only by the corresponding unit price selector into operative position, a stop mounted upon and movable with the carriage in position to engage any one of the stop levers which is in operative position, means controlled by actuation of any unit price selector to initiate movement of the carriage, means controlled by engagement of the carriage-mounted stop with any stop lever to stop the carriage and exactly position it relative to such stop lever, and means associated with the several unit price selectors to control the direction of movement of the carriage.

15. In combination with scale mechanism including a chart movable under the influence of a mass being weighed, and bearing a plurality of series of price calculations at different unit prices, a carriage guided for movement in each direction along a definite path transversely to such movement of the chart, a price indicator carried by the carriage and cooperating with the chart to indicate, by movement of the carriage, a given calculation in such series, a plurality of different unit price selectors, corresponding respectively to the different series, a plurality of stop levers, each movable only by the corresponding unit price selector into operative position, a slide mounted upon the carriage and movable relative thereto in the direction of the latter's movement, a second slide similarly mounted and movable relative to the carriage, spring means upon the carriage tending to return the first slide, after displacement, to its initial position, a stop upon this first slide in position to engage any one of the stop levers which is in operative position, thereby to displace this slide, a reversible motor to advance the carriage in one direction or the other, two sets of spaced-apart contacts on the first slide, an intermediate contact cooperating alternatively with one or the other sets of contacts, and mounted upon the second slide, and constituting, with said sets of contacts, a reversing switch, having a neutral position, in the motor circuit, a two-arm lever on the carriage, controlling movement of the second slide relative to the first, two bars upon the carriage engageable with opposite ends of said lever, means controlled by actuation of any unit price selector which lies in the direction from which the carriage last moved to engage one of said bars and to tilt the lever, shifting the second slide to close the reversing switch and effect reversal of the motor, engagement of the carriage-mounted stop with the stop lever operatively positioned by the just-operated unit price selector displacing the first slide and opening such switch.

16. In combination with scale mechanism including a chart bearing a plurality of series of price calculations, and movable under the influence of a mass being weighed, a plurality of movable unit price selector means, each corresponding to one of said series, a price indicator movable relative to the chart transversely of the direction of movement of the latter under the influence of a mass being weighed, means movable in response to movement of a unit price selector to move said price indicator into indicating position, and means to postpone movement of said last-mentioned means until the unit price selector means has returned to its initial position following movement therefrom.

17. In combination with scale mechanism including a chart bearing a plurality of series of price calculations, and movable under the influence of a mass being weighed, a plurality of movable unit price selectors, each corresponding to one of said series, a price indicator movable relative to the chart transversely of the latter's movement, motor means energizable to move the price indicator, a circuit controlling said motor, including a normally closed switch and a normally open switch, means movable in response to actuation of any price selector first to open the normally closed switch and then to close the normally open switch, and a time-delay device to delay opening in the normally open switch until after the normally closed switch has been closed by return of the actuated price selector to its initial position.

18. In combination with scale mechanism including a chart movable under the influence of a mass being weighed, and bearing a plurality of series of price calculations at different unit prices, a plurality of unit price selectors, a plurality of stop means each corresponding to a different one of said selectors, and each movable under the influence of actuation of the corresponding selector from an inoperative to an operative position, a price indicator guided for movement relative to the chart to indicate, in cooperation with the latter's movement, a given price, a stop movable with said indicator and engageable with any of said stop means which is in operative position, and means common to all the selectors, and movable upon actuation of any one, to engage any of said stop means which may be in operative position, to move the same into inoperative position, said last-mentioned means being disposed for operation in advance of movement of a new stop means, corresponding to a newly-actuated selector, into operative position.

19. In combination with scale mechanism including a chart movable under the influence of a mass being weighed, and bearing a plurality of series of price calculations at different unit prices, an indicator movable relative to said chart to indicate a selected series and, upon movement of the chart, a given calculation in such series, a plurality of selector means including a plurality of arms each movable at will from an initial position, a plurality of stop levers each corresponding to a different one of said arms, and located for engagement and movement by the corresponding arm, from an inoperative to an operative position, an indicator support guided for movement along the series of stop levers, a stop carried by said support, engageable by any stop lever in operative position, and means engageable by all the arms, and movable by any one, to engage all stop levers in operative position, and to move the same into inoperative position, said last-mentioned means being so operable prior to engagement of the arm with its corresponding stop lever.

20. In combination with scale mechanism, a chart bearing a plurality of price calculations at different unit prices, a plurality of unit price selector buttons, means operable by actuation of a button corresponding to a unit price selected, and means controlled by the combined operation of said first means and the scale mechanism to render visible to the observer only the single price calculation corresponding to the unit price selected and the mass being weighed.

PETER ASMUSSEN.